United States Patent [19]

Siemiatkowski

[11] Patent Number: 5,189,291
[45] Date of Patent: Feb. 23, 1993

[54] BAR CODE READER OPERABLE AS REMOTE SCANNER OR WITH FIXED TERMINAL

[75] Inventor: Bish Siemiatkowski, Los Gatos, Calif.

[73] Assignee: Symbol Technologies, Inc., Bohemia, N.Y.

[21] Appl. No.: 769,330

[22] Filed: Sep. 30, 1991

Related U.S. Application Data

[63] Continuation of Ser. No. 345,881, May 1, 1989, abandoned.

[51] Int. Cl.[5] ............................................. G06K 7/10
[52] U.S. Cl. .................................. 235/472; 235/462; 235/383
[58] Field of Search ............... 235/375, 383, 462, 472, 235/432, 493, 419; 455/603

[56] References Cited

U.S. PATENT DOCUMENTS

| | | | |
|---|---|---|---|
| 4,251,798 | 2/1981 | Swartz et al. | 340/146.3 |
| 4,369,361 | 1/1983 | Swartz et al. | 235/470 |
| 4,387,297 | 6/1983 | Swartz et al. | 235/462 |
| 4,409,470 | 10/1983 | Shepard et al. | 235/472 |
| 4,460,120 | 7/1984 | Shepard et al. | 235/472 |
| 4,465,926 | 8/1984 | Apitz et al. | 235/419 |
| 4,471,218 | 9/1984 | Culp | 235/462 |
| 4,673,805 | 6/1987 | Shepard et al. | 235/472 |
| 4,721,849 | 1/1988 | Davis et al. | 235/472 |
| 4,727,245 | 2/1988 | Dobbins et al. | 235/472 |
| 4,736,095 | 4/1989 | Shepard et al. | 235/472 |
| 4,758,717 | 7/1988 | Shepard et al. | 235/472 |
| 4,841,132 | 6/1989 | Kajitani et al. | 235/472 |
| 4,916,441 | 4/1990 | Gombrich | 235/472 |
| 4,924,171 | 5/1990 | Baba et al. | 235/493 |
| 4,933,538 | 6/1990 | Heiman et al. | 235/462 |
| 5,047,615 | 9/1991 | Fukumoto et al. | 235/472 |

FOREIGN PATENT DOCUMENTS

60-46667  3/1985  Japan ................................. 455/603

Primary Examiner—Robert Weinhardt
Attorney, Agent, or Firm—Arnold, White & Durkee

[57] ABSTRACT

A laser-scan bar code reader is mounted in a hand-held unit operable in two modes. In one mode the hand-held unit may be mounted in a fixed position in a terminal in which case the data generated from the bar code reading operation is transferred immediately to the terminal and the reader is powered continuously from the terminal unit. In the other mode, the hand-held unit is separated from the terminal and held manually, in which case the data from bar code reading is stored in a local memory to be later transferred to the terminal when the hand-held unit is again inserted into the terminal. A battery in the hand-held unit is charged when the unit is mounted in the terminal, then powers the hand-held unit while operating remote from the terminal. The power for battery charging and the data transfer are accomplished without direct connections between the hand-held unit and the terminal.

20 Claims, 5 Drawing Sheets

BAR CODE READER OPERABLE AS REMOTE SCANNER OR WITH FIXED TERMINAL

RELATED CASES

This application is a continuation of Ser. No. 345,881, filed May 1, 1989, now abandoned.

This application is related to copending U.S. patent application Ser. No. 260,692, filed Oct. 21, 1988, now U.S. Pat. No. 4,933,538, and Ser. No. 284,450 filed Dec. 14, 1988, now U.S. Pat. No. D307,894 this application discloses subject matter also disclosed in copending application Ser. No. 349,860 now abandoned, filed May 10, 1989; and Ser. No. 367,007, filed Jun. 16, 1989 now abandoned; said applications are assigned to Symbol Technologies, Inc.

BACKGROUND OF THE INVENTION

1. Field of the Invention

This invention generally relates to laser scanning systems for reading bar code symbols or similar indicia and, more particularly, to an arrangement including a handheld laser scanning unit for generating a laser beam scan pattern over the symbols to be read, and a terminal unit for displaying and storing data transferred from the scanning unit.

2. Description of the Related Art

Various optical readers and optical scanning systems have been developed heretofore for reading bar code symbols appearing on a label or on the surface of an article. The bar code symbol itself is a coded pattern of indicia comprised of a series of bars of various widths spaced apart from one another to bound spaces of various widths, the bars and spaces having different light-reflecting characteristics. A number of different bar code standards or symbologies exist. These symbologies include UPC/EAN, Code 128, Codabar, and Interleaved 2 to 5. The readers and scanning systems electro-optically decode the symbol to multiple alphanumerical characters that are intended to be descriptive of the article or some characteristic thereof. Such characters are typically represented in digital form as an input to a data processing system for applications in point-of-sale processing, inventory control, and the like. Scanning systems of this general type have been disclosed, for example, in U.S. Pat. Nos. 4,251,798; 4,360,798; 4,369,361; 4,387,297; 4,409,470 and 4,460,120, all of which have been assigned to the same assignee as the instant application.

As disclosed in some of the above patents, one embodiment of such a scanning system resides, inter alia, in an emitting a laser light beam from a hand-held, portable laser scanning head supported by a user, and aiming the head, and more particularly, the laser light beam, at a symbol to be read. The scanner functions by repetitively scanning the laser beam in a line across the symbol. A portion of the reflected laser light which is reflected off the symbol is detected, and electronic circuitry or software decodes the electrical signal into a digital representation of the data represented by the symbol scanned.

More specifically, a scanner includes a light source such as a gas laser or semiconductor laser that generates a light beam. The use of a semiconductor devices as the light source in scanner systems is especially desirable because of their small size, low cost and low power requirements. The light beam is optically modified, typically by a lens, to form a beam spot of a certain size. It is preferred that the beam spot size be approximately the same as the minimum width between regions of different light reflectivity, i.e., the bars and spaces of the symbol. The relative size of the bars and spaces is determined by the type of coding used, as is the actual size of the bars and spaces. The number of characters per inch represented by the bar code symbol is referred to as the density of the symbol.

The light beam is directed by the lens of similar optical components along a light path toward a target that includes a bar code symbol on the surface. A scanning component is also disposed in the light path. The scanning component may either sweep the beam spot across the symbol and trace a scan line across and past the symbol, or scan the field of view of the scanner or do both. A scanner also includes a sensor or photodetector. The photodetector has a field of view which extends across and slightly past the symbol and functions to detect light reflected from the symbol. The analog electrical signal from the photodetector is first typically converted into a pulse width modulated digital signal, with the widths corresponding to the physical widths of the bars and spaces. Such a signal is then decoded according to the specific symbology into a binary representation of the data encoded in the symbol, and to the alphanumeric characters so represented.

Laser scanners are not the only type of optical instrument capable of reading bar code symbols. Another type of optical reader is none which is operative being placed by the user in direct contact with the symbol to be read. Such readers typically incorporate detectors based upon charge coupled device (CCD) technology in which the size of the detector is larger than or substantially the same as the symbol to be read. Such scanners are lightweight and easy to use, but require substantially direct contact or placement of the reader on the symbol to enable the symbol to read. Such contact reading is a preferred mode of operation for some applications or as a matter of personal preference by the user. Contact or near contact reading may also be implemented in an appropriately designed laser scanner.

SUMMARY OF INVENTION

Briefly, and in general terms, the present invention provides a system for reading bar code symbols or the like, including a hand-held scanning unit in a lightweight, portable housing including symbol-detection means for generating a laser beam directed toward a symbol to be read, and for receiving reflected flight from such symbol to produce electrical signals corresponding to data represented by the symbol. A data transfer device is provided for transferring the data represented by the symbol externally of the scanning unit. A read-control device is provided to actuate the symbol-detection means to initiate reading of a symbol. A rechargeable power supply is also provided for supplying electrical power to the scanning unit.

The system also includes a terminal unit operable remotely from the scanner unit that includes a data input for receiving the data transferred from the data transfer device of the scanning unit. The terminal unit functions to display and store the data transferred from the scanning unit, and also functions to recharge the rechargeable power supply of the scanning unit when said scanning unit is placed in proximity to the terminal unit.

The invention generally relates to laser scanner systems for reading indicia of different light reflectivity such as bar code symbols. More particularly, the present invention provides a system for reading symbols, including a portable scanner operative in a hand-held mode supported by a user for reading symbols, and in a fixed station mode in which the scanner is coupled to a terminal.

According to one embodiment of the invention, a laser-scan bar code reader is mounted in a hand-held unit operable in two modes. In one mode the hand-held unit is mounted in a fixed position in a terminal, in which case the data generated from the bar code reading operation is transferred immediately to the terminal and the reader is powered continuously from the terminal unit. In the other mode, the hand-held unit is separated from the terminal and held manually, in which case the data from bar code reading is stored in a local memory to be later transferred to the terminal when the hand-held unit is again inserted into the terminal. A battery in the hand-held unit is charged when the unit is mounted in the terminal, then powers the hand-held unit while operating remote from the terminal. The power for battery charging and the data transfer are accomplished without direct connections between the hand-held unit and the terminal.

The laser scanner in the present invention in the workstation mode is operable in two power levels, similar to that described in the above-mentioned co-pending U.S. patent application Ser. No. 260,692, filed Oct. 21, 1988, assigned to Symbol Technologies, Inc., incorporated herein by reference. When in the stationary mode, inserted in the fixed terminal, the scanner is in a low level, short scan condition, in which case it can recognize a bar code symbol but cannot properly decode it; when a bar code is recognized the unit switches to the higher level condition whereby the scan line is longer and the laser power level is higher so a full decode is possible.

BRIEF DESCRIPTION OF THE DRAWINGS

The novel features characteristic of the invention are set forth in the appended claims. The invention itself, however, as well as other features and advantages thereof, will be best understood by reference to a detailed description of a specific embodiment, when read in conjunction with the accompanying drawings, wherein:

DETAILED DESCRIPTION OF SPECIFIC EMBODIMENT

Figure 1A:
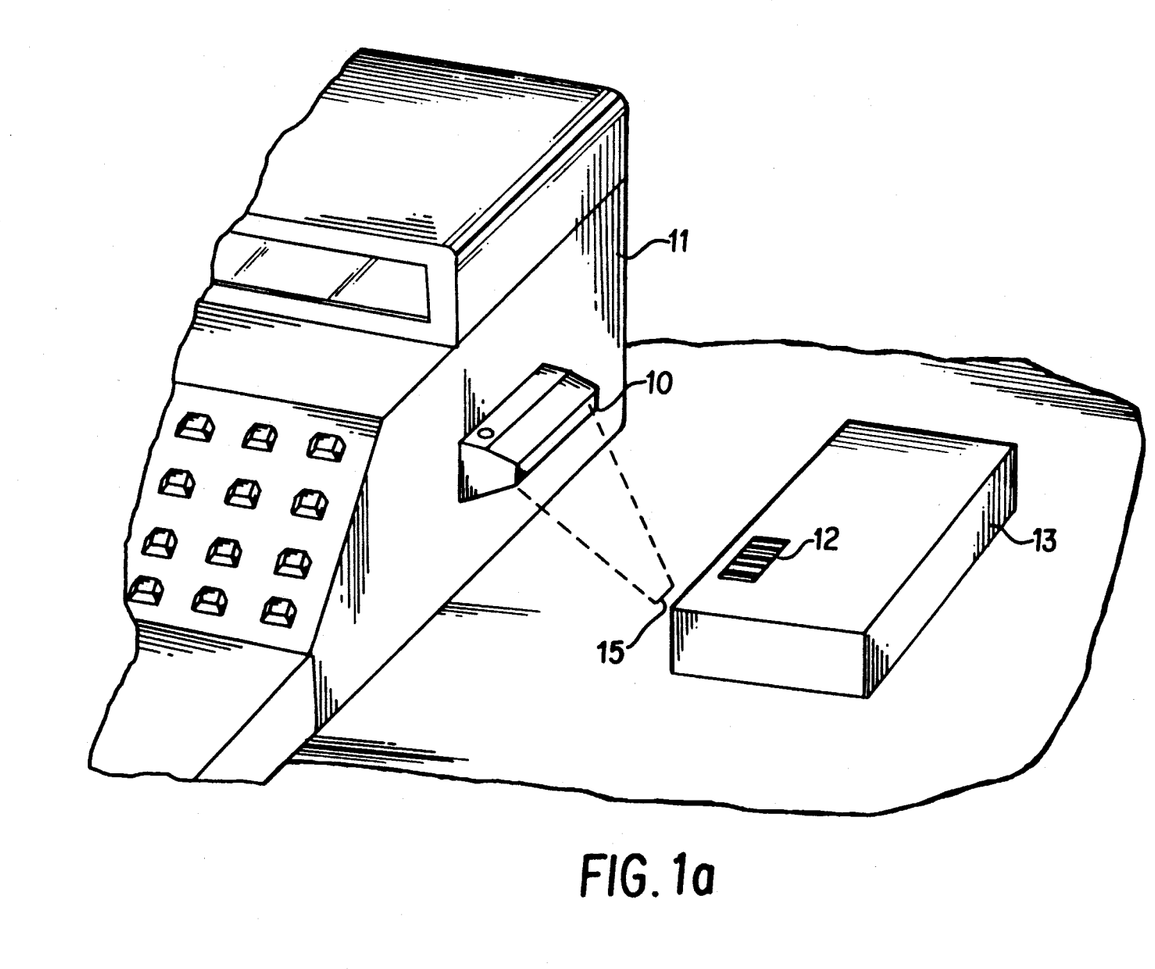
FIG. 1a is a perspective view of a hand-held laser scanner unit coupled to the terminal unit in accordance with one embodiment of this invention, and diagrammatically illustrating a low power scan pattern.
Figure 1B:
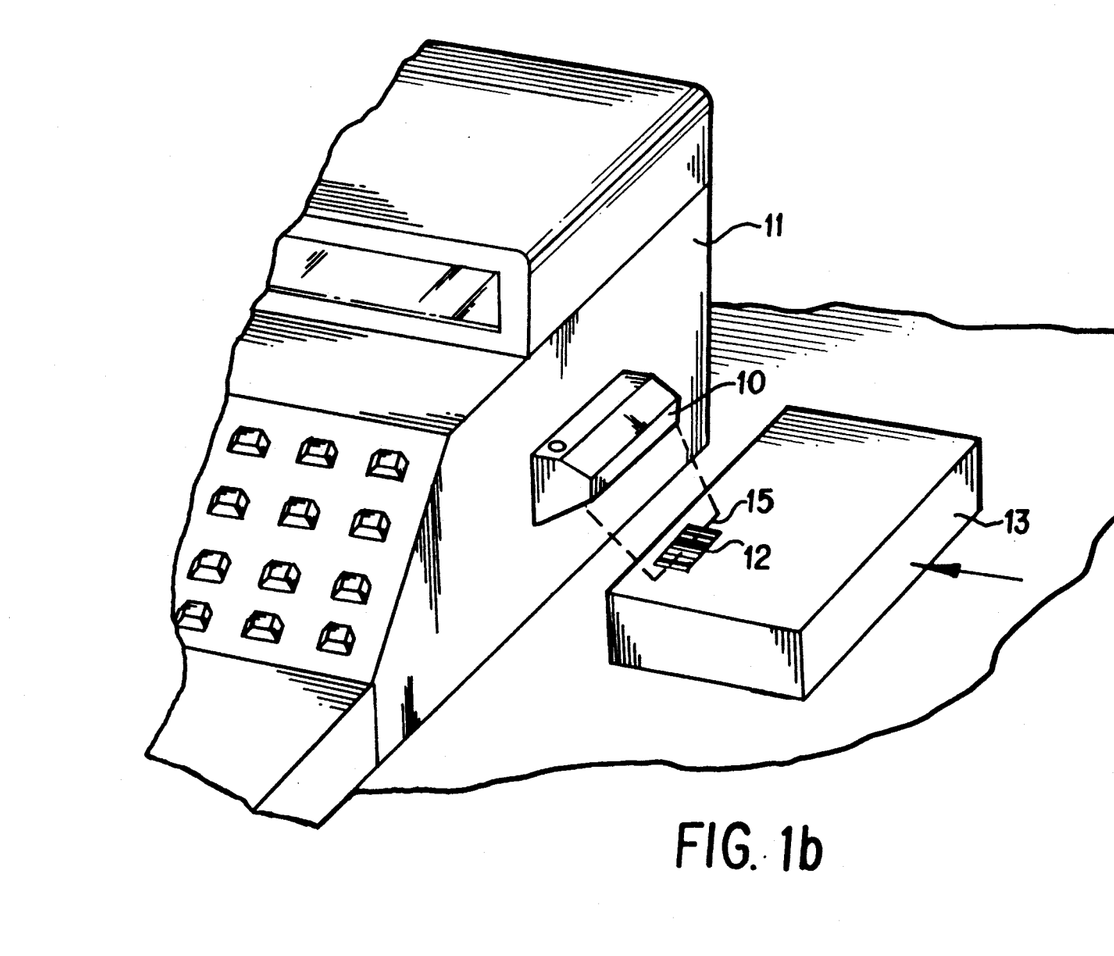
FIG. 1b is a perspective view of the hand-held laser scanner unit of FIG. 1a, coupled to the terminal unit in accordance with one embodiment of this invention, and diagrammatically illustrating a high power scan pattern.
Figure 2:
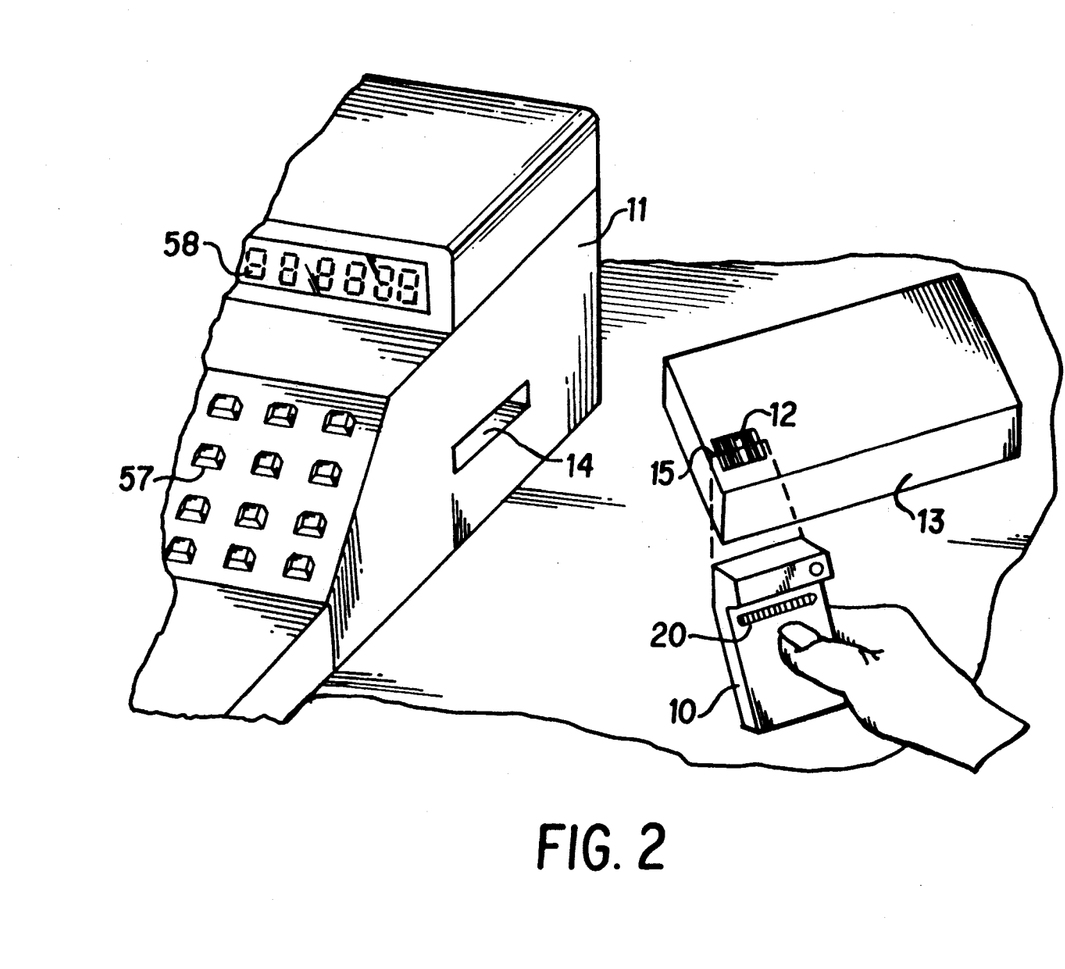
FIG. 2 is a perspective view of the hand-held laser scanner unit of FIGS. 1a and 1b used remotely from the terminal unit in accordance with this invention.

A bar code scanner according to one embodiment of the invention is illustrated in FIGS. 1a and 1b, where a removable hand-held scanner 10 is shown inserted in a terminal 11 for reading a bar code 12 on the surface of an article 13. The scanner 10 is constructed so that it has two modes of operation, one where it is inserted in a slot 14 in the terminal 11, and another where the scanner 10 is removed from the slot 14 and held by hand as illustrated in FIG. 2. Further, while the scanner 10 is in the mode of FIGS. 1a and 1b, the laser scan has a low-power scanning mode in which the scan line 15 is short (and therefore brighter) and the current driving the laser is reduced, as in the FIG. 1a condition. When an object resembling a bar code is moved into the field of the scan as illustrated in FIG. 1b, the signal detected is adequate to be recognized as a bar-code type output, and this output is used to trigger a switch to the high-power mode wherein the drive to the laser is increased and the scan line 15 is made longer, so that a complete scan and decode can be done rapidly. By using this dual-mode scan, the lifetime of the laser diode used to generate the laser scan line 15 is increased, as the laser will be driven at a low-power condition for most of its operating life.

Figure 3:
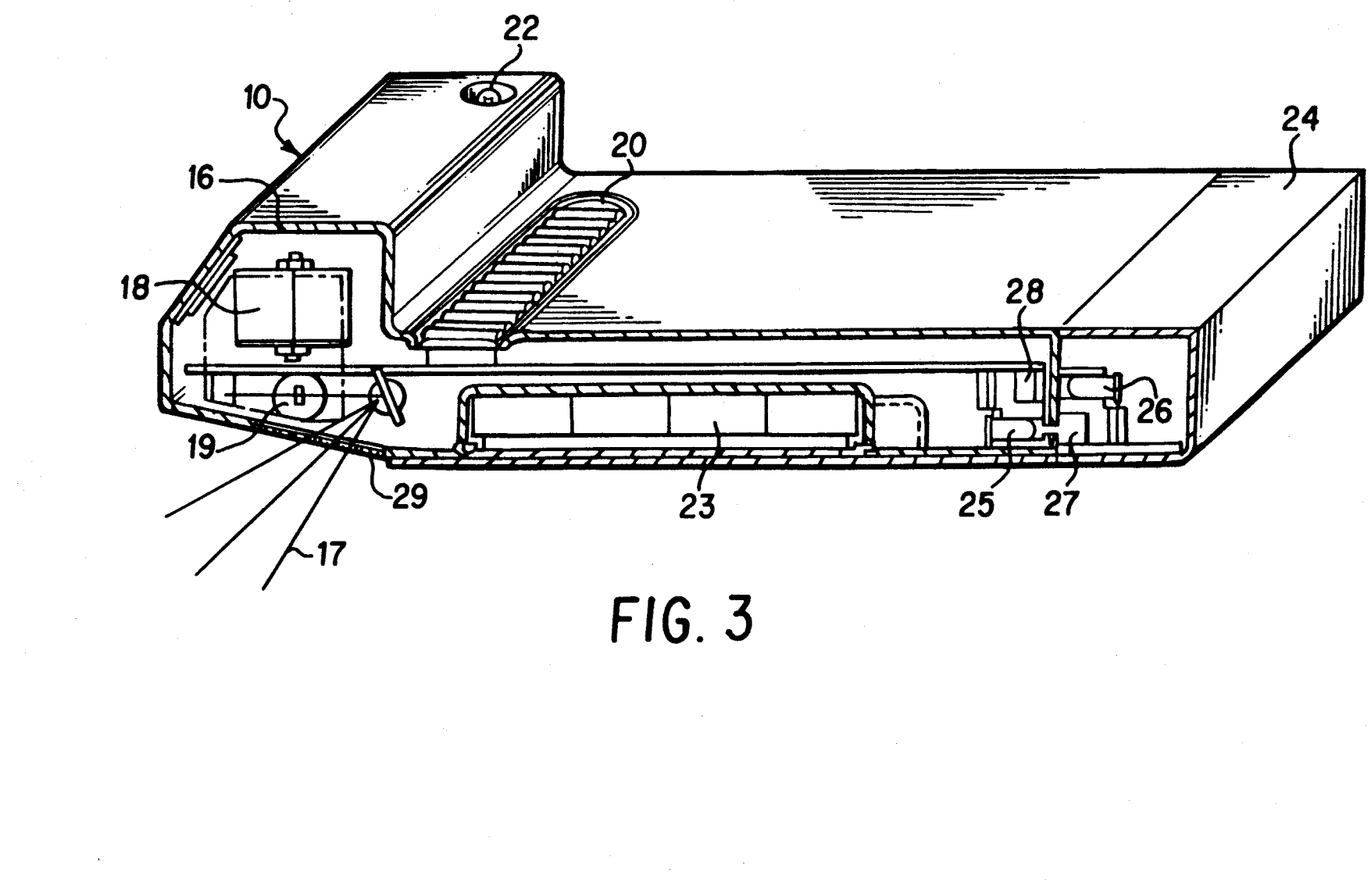
FIG. 3 is a diagrammatic cut-away illustration of the hand-held laser scanner according to the embodiment of the present invention of FIG. 2.

The portable scanner 10 is shown in cut-away view in FIG. 3 and includes a housing 16 with a mechanism in the housing for generating a light beam 17 and transmitting the light beam toward each symbol to be read; in a preferred embodiment, a motor 18 is used to oscillate an optical element 19 which directs the path of a laser beam. Also, a photodetector element is included for receiving reflected light from a symbol 12. While in the hand-held operating mode of FIG. 2, the scan is activated by a pushbutton switch 20 (trigger bar) located on the upper part of the housing 16, so there is no need for the dual power level mode of operation to save laser life. That is, when the pushbutton switch 20 is pressed by the operator, the laser scan is initiated at full power to generate a scan line 15 to traverse the bar code symbol 12 to be read. If a recognizable bar code is decoded by the electrical circuitry as will be described, an indicator light 22 is activated to signify to the user that the scan was successful. The housing 16 contains batteries 23 for powering the unit when in the hand-held mode, and these batteries are preferably of the miniature rechargeable lead-acid type which are commercially available; to avoid the necessity for plug-in connectors, this same power supply is used to power the hand-held unit even when it is in the stationary position in the slot 14. The batteries are recharged when the unit 10 is plugged into the terminal 11 by an open-frame transformer, so there are no wired connections between the hand-held unit and a fixed coupler 24 located at the back of the slot 14 to receive the unit 10. That is, the coupler 24 is not part of the unit 10 removed from the fixed terminal 11. Light coupling is used to transfer signals and data between the unit 10 and the terminal 11, and for this purpose two pairs of semiconductor optical couplers are included, consisting of light-emitting diodes 25 and 26 and light-responsive transistors 27 and 28. The housing 16 is composed of light-weight plastic, and has a window 29 which is transparent to the laser light beam 17.

Figure 4:
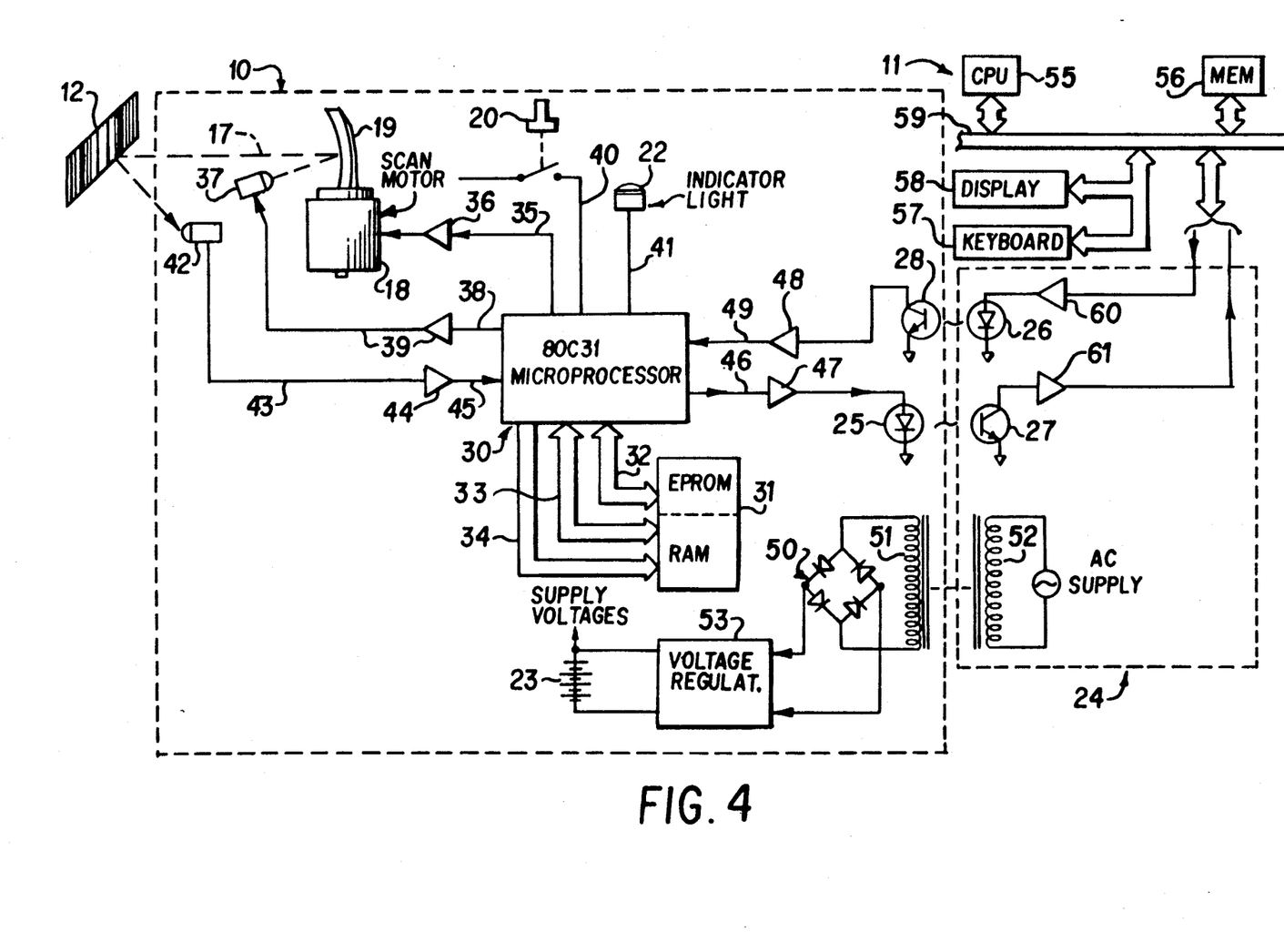
FIG. 4 is an electrical diagram in block form of the hand-held laser scanner and the associated terminal according to one embodiment of the present invention.

Referring to FIG. 4, the circuitry included within the housing 16 of the hand-held unit 10 is shown in block diagram form. The control and data handling functions are provided by a microprocessor or microcontroller device 30 which may be, in a preferred embodiment, a 80C31 microcontroller chip manufactured by Intel. This 80C31 device is a low-power CMOS 8-bit processor containing 128-bytes of on-chip RAM, two 16-bit timer-counters, and having four 8-bit general-purpose I/O ports (32-bit I/O) which are used for accessing an off-chip memory 31. The off-chip memory 31 includes EPROM for holding the code to be executed, and RAM for temporarily storing the bar code data before the data is transferred to the terminal 11. The offchip memory 31 is accessed by an address bus 32 and a data bus 33, along with control lines 34 for read/write and data-enable controls as may be required; these access busses are provided by the I/O ports of the microcontroller chip 30. Examples of instruction code to be stored in the EPROM for defining the operation of the controller chip are available from the manufacturer of the 80C31 device, and would include standard data-move routines for parallel and serial ports, and timer routines.

The scan motor 18 is activated by an output 35 from the microcontroller 30 and a drive circuit 36. Likewise, the laser diode 37 for generating the beam 17 is activated under control of the microcontroller 30 at an output 38, using a drive circuit 39 to increase the power level. The trigger bar or pushbutton switch 20 provides an input 40 to the microcontroller 30, and an output 41 is used to drive the indicator light 22. Each of these inputs and outputs 35, 38, 40 and 41 is provided by one of the lines of the 32-bit I/O of the microcontroller, accessed by set-bit or test-bit instructions of the code which is executed. Thus, when the pushbutton 20 is activated, this is detected by the microcontroller 30 and the laser diode 37 is energized for a time period established by the internal timer counters of the microcontroller chip; at the same time, the scanner motor 20 is activated.

Light reflected from the bar code symbol 12 is detected by a photodetector 42 to produce an analog signal on line 43 related to light level, and this analog signal is amplified and clipped by a shaping circuit 44 to produce a pulse-width modulated digital signal on line 45 which is another of the port inputs to the microcontroller 30. The digital signal is stored in internal RAM and processed to determine whether or not a recognizable bar code is present, and if so, the start and stop codes usually present are found in the digital signal and the characters are separated out and stored in the RAM portion of the memory 31.

To transfer data and commands to and from the terminal 11, the hand-held unit 10 contains the light-emitting diode 25 and light-responsive transistor 28 as mentioned above. The diode 25 is activated by an output 46 from the microcontroller 30 along with a drive circuit 47 which increases the power level of the drive signal. Thus, data from the memory 31 representing valid bar code characters detected by the scan operation is transferred to the terminal 11 by digital pulses generated in the microcontroller 30 and applied to the output port line 46. Input signals from the phototransistor 28 are shaped in circuitry 48 and applied as digital data to an input port line 49 to the microcontroller 30. In this manner, when the hand-held unit 10 is plugged into the slot 14 of the terminal 11, the microcontroller 30 can detect that the unit is in the mode of FIGS. 1a and 1b by command signals from the terminal 11 via phototransistor 28 and input 49, and so the microcontroller 30 will enter a routine whereby any data collected by bar code scans and stored in the memory 31 will be transferred to the terminal 11 via output 46 and light-emitting diode 25. Thereafter, so long as the hand-held unit stays in the slot 14, the microcontroller monitors the "stationary" command received at input 49 and goes into the two-level scan mode described above, and disables the pushbutton switch 20. Whenever the "stationary" command is no longer received at input 49, this means the hand-held unit 10 is no longer in the slot 14, so the microcontroller 30 returns to the mode whereby the pushbutton switch 20 must be pushed to begin a scan.

The batteries 23 are charged by a full-wave bridge rectifier 50 which has its input connected to a secondary winding 51 of a transformer which is open-frame coupled to a primary winding 52 located in the fixed-mounted unit 24 of the terminal 11. That is, the primary and secondary of this transformer are located close enough together when the hand-held unit 11 is in the slot 14 so that sufficient coupling is provided to transfer AC power to the secondary winding 51. The output of the rectifier 50 is connected by a voltage regulator 53 to the batteries 23, and the voltage across the batteries is used as the supply voltage to the microcontroller 30, memory 31, motor 18 and other elements of the circuitry within the hand-held unit.

Within the terminal 11, a processor 55, which may be of the 8088 type, for example, is used to control the operations and data transfers to and from a memory 56. The keyboard 57 and display 58 of the fixed terminal are also driven by this processor. The light-emitting diode 26 and the phototransistor 27 are driven or accessed by the main bus 59 of the processor 55 via shaping or drive circuits 60 and 61, using memory-mapped I/O accesses, for example.

While this invention has been described with reference to a specific embodiment, this description is not meant to be construed in a limiting sense. Various modifications of the disclosed embodiment, as well as other embodiments of the invention, will be apparent to persons skilled in the art upon reference to this description. It is therefore contemplated that the appended claims will cover any such modifications or embodiments as fall within the true scope of the invention.

What is claimed is:

1. A system for reading bar code symbols, comprising:
    (a) a hand-held scanning unit in a lightweight, portable housing operating in a remote mode uncoupled from a terminal unit and operating in a coupled mode engaging a terminal unit, said scanning unit including: symbol-detection means for generating a light beam directed toward a symbol to be read, and for receiving reflected light from such symbol to produce electrical signals corresponding to data represented by the symbol; data transfer means for transferring the data represented by the symbol externally of said scanning unit and for receiving information from a source external to said scanning unit, by first coupling means requiring no direct electrical connection when in said coupled mode; read-control means to actuate said symbol-detection means to initiate reading of a symbol; and a rechargeable power supply in said scanning unit for supplying electrical power to said scanning unit, said power supply including second coupling means for receiving power for recharging; and (b) a terminal unit operating remotely from said scanning unit when in said remote mode and operating coupled to said scanning unit when in said coupled mode, said terminal unit including: data input means for receiving the data transferred from the data transfer means of said scanning unit by transmission without direct electrical connection when the scanning unit engages the terminal unit via said first coupling means in said coupled mode, and data output means for transmitting information to said scanning unit via said first coupling means, to thereby receive data from and transfer information to said scanning unit without direct electrical connection; means for displaying and storing the data transferred from said scanning unit; and means for transferring power to said second coupling means by power transmission without direct electrical connection for recharging said rechargeable power supply of said scanning unit when said scanning unit engages said terminal unit in said coupled mode; said scanning unit by said symbol-detection means generating said laser beam and receiving said reflected light when in said coupled mode in response to said information transferred from said terminal unit.

2. A system as defined in claim 1 wherein said symbol-detection means includes scanning means for repetitively scanning said beam over at least a portion of a symbol to be read.

3. A system as defined in claim 2 wherein said symbol-detection means includes photodetector means for detecting at least a portion of said light reflected from each symbol.

4. A system as defined in claim 3 including in said scanning unit means responsive to successful recognition of a symbol to be read to produce an indication, and means responsive to said indication to terminate actuation of the symbol-detection means.

5. A system as defined in claim 1, wherein said scanning unit further includes means for storing said data representing symbols read.

6. A system as defined in claim 1, wherein said read-control means comprises a switch on the housing for initiating reading of each symbol upon each manual actuation of the switch by the user.

7. A system as defined by claim 1, including means in said scanning unit for detecting a successful decoding of a symbol to be read.

8. A system as defined in claim 1, wherein said terminal unit includes a terminal housing having a rectangular slot that is adapted to receive said portable housing of said scanning unit when said scanning unit engages said terminal unit, said rectangular slot of said terminal housing having a seating portion to receive an interior end portion of said portable housing of said scanning unit, said seating portion including said data output means and said data input means to receive said data transferred by said scanning unit.

9. A system as defined in claim 8, wherein said terminal unit comprises object sensor means to detect when an object bearing a bar code label is moved into a field of view of said symbol-detection means of said scanning unit when said scanning unit is seated in said rectangular slot.

10. A system as defined in claim 1, wherein said terminal unit includes a housing having a slot adapted to receive said scanning unit when said scanning unit engages said terminal unit, and means in said slot for transferring data to or information from said scanning unit.

11. A system according to claim 10, wherein said means for transferring power to said scanning unit for charging said rechargeable power supply in said scanning unit is located in said slot of the terminal unit.

12. A system for reading bar code symbols, comprising:

(a) a hand-held scanning unit in a lightweight, portable housing, operable in a remote mode not connected with a terminal unit and also operable in a coupled mode wherein the scanning unit is coupled to a terminal unit; said scanning unit including: symbol-detection means for generating a light beam directed toward a symbol to be read and for receiving reflected light from such symbol to produce electrical signals corresponding to data represented by the symbol; read-control means in said unit to actuate said symbol-detection means to initiate reading of a symbol; a battery; and data transfer means for transferring the data represented by the symbol externally of said scanning unit to said terminal unit and for receiving information from said terminal unit when said scanning unit is in said coupled mode via coupling means requiring no direct electrical connection; and (b) a terminal unit operable remotely from said scanner unit and receiving said scanning unit in a receptacle, the terminal unit including data input/output means without direct electrical connection to the data transfer means for receiving the data transferred from the data transfer means of said scanning unit and for transmitting information to said scanning means via said coupling means only when said scanning unit is in said receptacle operating in said coupled mode; means for displaying and storing the data transferred from said scanning unit; and means for activating said read-control means of said scanning unit in response to said information from said received terminal unit via said data transfer means when said scanning unit is placed in said receptacle of said terminal unit and operating in said coupled mode.

13. A system as defined in claim 12, wherein said beam is a laser beam, and said scanner unit includes means for providing first and second scanning modes for said laser beam, and said first scanning mode is a low power standby mode for detecting a symbol but not reading the symbol and said second scanning mode is high power reading mode for reading the symbol.

14. A system as defined in claim 13, wherein in said first scanning mode said laser beam traces a scanning line having a first length in a reference plane lying generally normal to the optical path of said laser beam, and in said second scanning mode said laser beam traces a scanning line in said reference plane having a second length greater than said first length.

15. A system as defined in claim 12 wherein said scanner unit includes detector means responsive to light reflected from a symbol to detect the presence of a symbol, and wherein said read control means is responsive to said detector means and activated when an object having a reflected light characteristic that could be indicative of the presence of a symbol is detected.

16. A system for reading symbols, comprising:

(a) a portable scanner operative in a hand-held mode supported by a user and in a terminal-supported mode for reading symbols, and in data transfer mode, said scanner including (i) a housing;

(ii) reader means in the housing for transmitting a light beam toward and scanning across each symbol to be read, and for receiving reflected light from each symbol, and for processing the scan of reflected light into electrical signals corresponding to data indicative of each symbol, said reader means being operated by control means in said housing to provide said scanning in said hand-held mode, (iii) local data storage in said housing means for storing the data, (iv) means for initiating the reading of each symbol, and (v) a rechargeable power supply in said housing for supplying electrical power to the scanner, the rechargeable power supply including coupling means for receiving power, (vi) means for transferring data from said local data storage; and (b) a terminal located remotely from the scanner when the scanner is used in the hand-held mode, and coupled to and supporting the scanner when the scanner is in said terminal-supported mode and the data transfer mode, and including (i) a main data storage means, and (ii) actuatable recharge means for supplying power to said coupling means for recharging the rechargeable power supply; and (iii) means for receiving and supporting the scanner on the terminal in the terminal-supported mode and data transfer mode, said receiving and supporting means including data transfer means for coupling to said means for transferring data without direct electrical connection and operative for transferring the data stored in the local data storage means of the scanner to the main data storage means in the terminal and for transmitting information from the terminal, and means for actuating the recharge means and supplying power by said coupling means without direct electrical connection to recharge the rechargeable power supply in said scanner;

(c) said control means, in response to said information from said terminal received via said means for receiving and supporting, operating said reader means in said terminal-supported mode when said scanner is received and supported by said terminal.

17. A system as defined in claim 16, wherein said means for actuating the recharge means is responsive to said scanner being mounted on the terminal.

18. A system as defined in claim 16, wherein said recharge means comprises an induction coil for transferring power via said coupling means to said scanner by induction.

19. A system as defined in claim 16, wherein said means for transferring data and said data transfer means include a light emitting diode for wireless transmission of the data to said main data storage means.

20. A system as defined in claim 16, wherein said terminal includes a base portion on which said terminal is seated, and said means for receiving and supporting the scanner functions to direct the light beam emitted from said scanner in the data transfer mode to a reference plane adjacent to said base portion.

* * * * *

UNITED STATES PATENT AND TRADEMARK OFFICE
CERTIFICATE OF CORRECTION

PATENT NO. : 5,189,291
DATED : February 23, 1993
INVENTOR(S) : Bish SIEMIATKOWSKI It is certified that error appears in the above-indentified patent and that said Letters Patent is hereby corrected as shown below:

Column 7, line 22, change "laser" to --light--.

Signed and Sealed this

Fifteenth Day of February, 1994

Attest:

BRUCE LEHMAN

Attesting Officer     Commissioner of Patents and Trademarks